(12) United States Patent
Ito

(10) Patent No.: US 7,800,258 B2
(45) Date of Patent: Sep. 21, 2010

(54) DRIVING APPARATUS, EXPOSURE APPARATUS, AND DEVICE MANUFACTURING METHOD

(75) Inventor: Atsushi Ito, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 177 days.

(21) Appl. No.: 12/203,771

(22) Filed: Sep. 3, 2008

(65) Prior Publication Data
US 2009/0058199 A1    Mar. 5, 2009

(30) Foreign Application Priority Data
Sep. 4, 2007    (JP)   ............... 2007-228543

(51) Int. Cl.
*H02K 41/00* (2006.01)
(52) U.S. Cl. ................. 310/12.29; 310/12.01
(58) Field of Classification Search .......... 310/12.01, 310/12.02, 12.29, 12.33, 52
See application file for complete search history.

(56) References Cited

U.S. PATENT DOCUMENTS

| | | | | |
|---|---|---|---|---|
| 6,107,905 A | * | 8/2000 | Itoh et al. | ................. 335/216 |
| 7,105,957 B2 | * | 9/2006 | Lee | ............................. 310/14 |
| 7,462,961 B2 | * | 12/2008 | Kwon et al. | .................. 310/52 |
| 2004/0126907 A1 | | 7/2004 | Korenaga | |
| 2005/0248219 A1 | | 11/2005 | Korenaga | |

FOREIGN PATENT DOCUMENTS

| | | |
|---|---|---|
| JP | 2004-235653 | 8/2004 |
| JP | 2004-254489 | 9/2004 |

* cited by examiner

*Primary Examiner*—Nguyen N Hanh
(74) *Attorney, Agent, or Firm*—Canon USA Inc IP Div

(57) ABSTRACT

A driving apparatus includes a mover having a magnet, and a stator having a coil. The driving apparatus is adapted to control the electric current to be applied to the coil to cause relative movement between the mover and the stator. The stator includes a coil holding member configured to hold the coil, a supporting member configured to support the coil holding member movably in first and second directions, a restriction member configured to restrict movement of the coil holding member in the first direction and to allow movement of the coil holding member in the second direction, and a biasing unit configured to press the coil holding member against the restriction member.

13 Claims, 15 Drawing Sheets

FIG. 7A
FIG. 7B
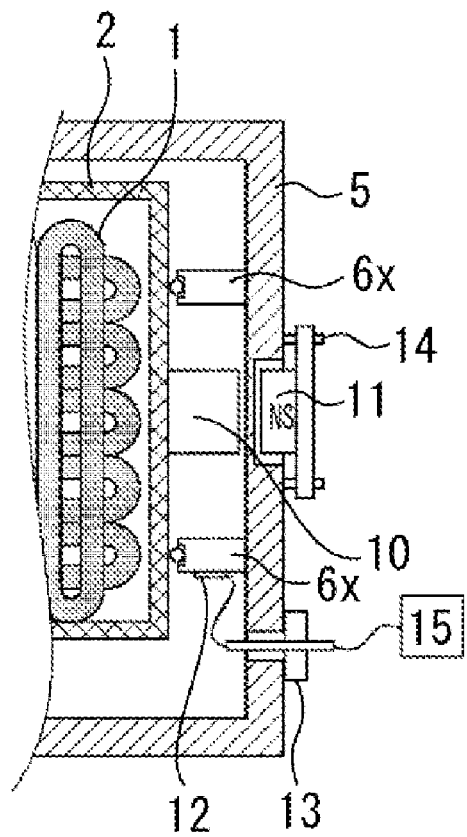
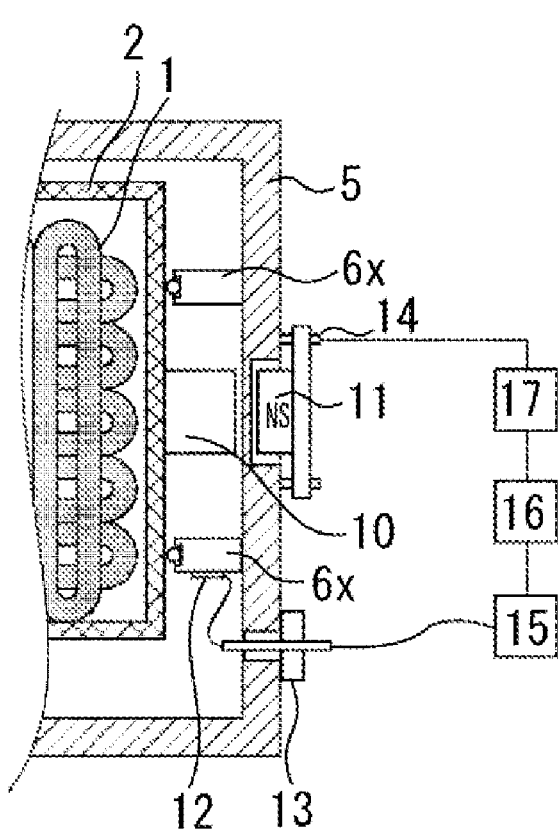

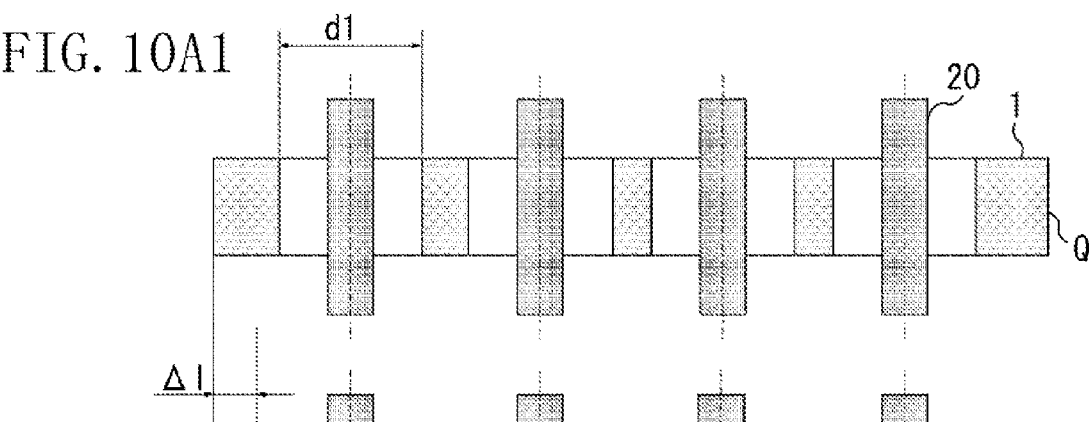
FIG. 10A1
FIG. 10A2
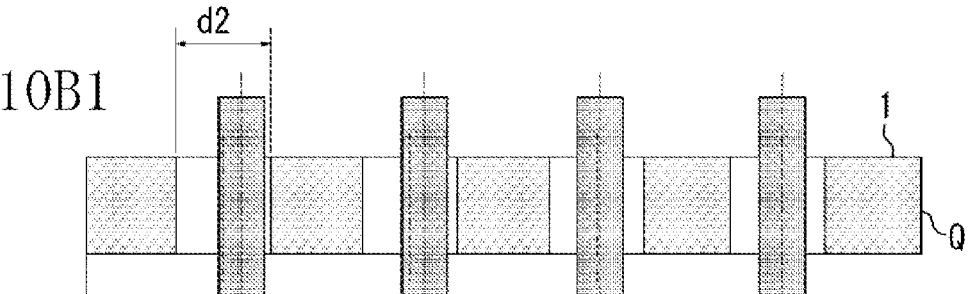
FIG. 10B1
FIG. 10B2

DRIVING APPARATUS, EXPOSURE APPARATUS, AND DEVICE MANUFACTURING METHOD

BACKGROUND OF THE INVENTION

1. Field of the Invention

The present invention relates to a driving apparatus, an exposure apparatus utilizing the driving apparatus, and a device manufacturing method utilizing the exposure apparatus.

2. Description of the Related Art

A semiconductor exposure apparatus for transferring a pattern formed on a reticle onto a substrate, such as a wafer, onto which resist is applied, is used in a lithographic process for manufacturing devices such as semiconductor devices and liquid crystal display devices.

Japanese Patent Application Laid-Open No. 2004-254489 discusses a stage apparatus for positioning a wafer and a reticle at predetermined places in an in-plane direction. FIGS. 14A and 14B illustrate a planar motor type stage apparatus discussed in Japanese Patent Application Laid-Open No. 2004-254489. This stage apparatus includes mover magnets 114 and a stator 100. The mover magnets 114 are arranged periodically in a plate-like surface of a mover 110 and are magnetized in a predetermined direction. The stator 100 includes stator coils 116 arranged in an arrangement cycle corresponding to that of the mover magnets 114. The stage apparatus further includes an electric current control unit (not shown) that supplies electric currents, which differ in phase from one another, to the stator coils 116 to generate a driving force for driving the mover 110 between the mover magnets 114 and the stator coils 116 facing the mover magnets 114.

The stator coils 116 are constructed by providing a plurality of layers in each of which substantially oval coils are arranged in a plane. Each of the coils is shaped into an oval. A large number of coils are arranged in a plane. Thus, the mover 110 can have a desired stroke.

Mirrors (not shown) for detecting the position and attitude of the mover 110 are provided on the side surface and top surface of the mover 110. The position and attitude of the mover 110 in the directions of six degrees of freedom can be measured using, e.g., a laser interferometer. A driving force is controlled based on the measured values. Thus, the positioning of the mover 110 in six degrees of freedom can be controlled.

Recently, there have been increasing demands not only for achieving high positioning accuracy in a stage unit of an exposure apparatus to cope with micropatterning but for achieving a high acceleration of the stage unit to increase productivity. One method for achieving a high acceleration is to increase electric current applied to a stator coil. However, when electric current to be applied to the stator coil is increased, the power consumption of the stator coil considerably increases as Joule heating of the coil.

A method for cooling coils made of a normal conduction material, such as copper, to a low temperature in order to reduce electric resistance and a method for using a superconductive material, whose electric resistance is extremely low at a low temperature, as a material of coils are considered as methods for reducing the power consumption. For example, the electric resistance of copper at a liquid nitrogen temperature is reduced to about $1/10$ in comparison with the electric resistance at normal temperature. Thus, the power consumption in the case of applying the same amount of electric current to the coils can be reduced to about $1/10$.

Japanese Patent Application Laid-Open No. 2004-235653 discusses an apparatus and a method for supporting coils to be cooled to a low temperature. As illustrated in FIG. 15, the apparatus discussed in Japanese Patent Application Laid-Open No. 2004-235653 includes a superconducting coil 201 and a container 205, which surrounds the superconducting coil 201 and maintains the inside thereof in a vacuum condition. This apparatus further includes a magnetic shield 230, which surrounds the container 205, and an adjustment mechanism 241, which adjusts the positional relationship between the magnetic shield 230 and the superconducting coil 201 by adjusting the relative position of the magnetic shield 230 with respect to the container 205.

In the case where a coil to be cooled to a low temperature is used in an exposure apparatus, it is necessary to consider at least the following respects concerning a method for supporting the coil.

First, even when the coil is thermally contracted, sufficient positional accuracy of the entire coil should be satisfied. When the positional accuracy of the coil is degraded, variation in driving force occurs. Thus, the positioning accuracy of a stage maybe adversely affected. In the case where the coil is cooled again after the temperature of the coil is returned to normal temperature in a state in which the coil is cooled for maintenance, sufficient reproducibility of the position of the coil is needed.

According to the method discussed in Japanese Patent Application Laid-Open No. 2004-235653, after the coil is thermally contracted, the coil is supported by pushing adjustment screws against both sides of the coil. Consequently, the positioning of the coil can be achieved using the adjustment screws without forcedly suppressing the thermal contraction.

In the apparatus discussed in Japanese Patent Application Laid-Open No. 2004-235653, when a radiation shield is thermally contracted by cooling the coil, the radiation shield may fail to contact the adjustment screws. Accordingly, when the position of the coil is adjusted, it is necessary to adjust the position of the coil after the adjustment screws are brought into contact with the radiation shield each time when the coil is cooled.

However, because the adjustment of the position of the coil is performed each time when the coil is cooled, it is difficult to restore the position of the coil to the same position each time when the coil is cooled.

SUMMARY OF THE INVENTION

The present invention is directed to a driving apparatus that is capable of reducing the time and effort required to adjust the position of a coil each time the coil is cooled, and that is capable of enhancing the reproducibility of the position of the coil when the coil is cooled again.

According to an aspect of the present invention, a driving apparatus includes a mover having a magnet, and a stator having a coil, wherein the driving apparatus is adapted to control the electric current to be applied to the coil to cause relative movement between the mover and the stator, and wherein the stator includes a coil holding member configured to hold the coil, a supporting member configured to support the coil holding member movably in first and second directions, a restriction member configured to restrict movement of the coil holding member in the first direction and to allow movement of the coil holding member in the second direction, and a biasing unit configured to press the coil holding member against the restriction member.

According to another aspect of the present invention, a driving apparatus includes a mover having a magnet, and a stator having a coil, wherein the driving apparatus is adapted to control the electric current to be applied to the coil to cause relative movement between the mover and the stator, wherein the stator includes a coil holding member configured to hold the coil, a cooling unit configured to cool the coil, a plate spring configured to support the coil holding member and to have stiffness in a first direction, which is lower than stiffness in other directions, a restriction member configured to restrict movement of the coil holding member in the first direction and to allow movement of the coil holding member in a second direction, and a biasing unit configured to press the coil holding member against the restriction member.

According to still another aspect of the present invention, a driving apparatus includes a mover having a magnet, and a stator having a coil, wherein the stator includes a coil holding member configured to hold the coil, a plate spring configured to support the coil holding member, wherein the plate spring has a stiffness in a direction toward a center of thermal contraction of the coil holding member, which is lower than the stiffness in other directions.

According to yet another aspect of the present invention, an exposure apparatus for exposing a wafer with a pattern of a reticle includes a stage configured to mount one of the reticle and the wafer, wherein the stage includes a driving apparatus including a mover having a magnet and a stator having a coil, and being configured to control electric current to be applied to the coil to cause relative movement between the mover and the stator, and wherein the stator includes a coil holding member configured to hold the coil, a supporting member configured to support the coil holding member movably in first and second directions, a restriction member configured to restrict movement of the coil holding member in the first direction and to allow movement of the coil holding member in the second direction, and a biasing unit configured to press the coil holding member against the restriction member.

According to a further aspect of the present invention, a device manufacturing method for manufacturing a device includes exposing a wafer with a pattern of a reticle using an exposure apparatus, and developing the exposed wafer, wherein the exposure apparatus includes a stage configured to mount one of the reticle and the wafer, wherein the stage includes a driving apparatus including a mover having a magnet and a stator having a coil cooled by a cooling unit, and being configured to control electric current to be applied to the coil to cause relative movement between the mover and the stator, and wherein the stator includes a coil holding member configured to hold the coil, a supporting member configured to support the coil holding member movably in first and second directions, a restriction member configured to restrict movement of the coil holding member in the first direction and to allow movement of the coil holding member in the second direction, and a biasing unit configured to press the coil holding member against the restriction member.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 7A and 7B each illustrate a configuration of a driving apparatus using a pressing force measurement unit and a pressing force control unit.

FIGS. 10A1, 10A2, 10B1, and 10B2 each illustrate a state of a driving apparatus according to the third exemplary embodiment of the present invention.

DETAILED DESCRIPTION OF THE EMBODIMENTS

Various exemplary embodiments, features, and aspects of the invention will be described in detail below with reference to the drawings.

First Exemplary Embodiment

Figure 1A:
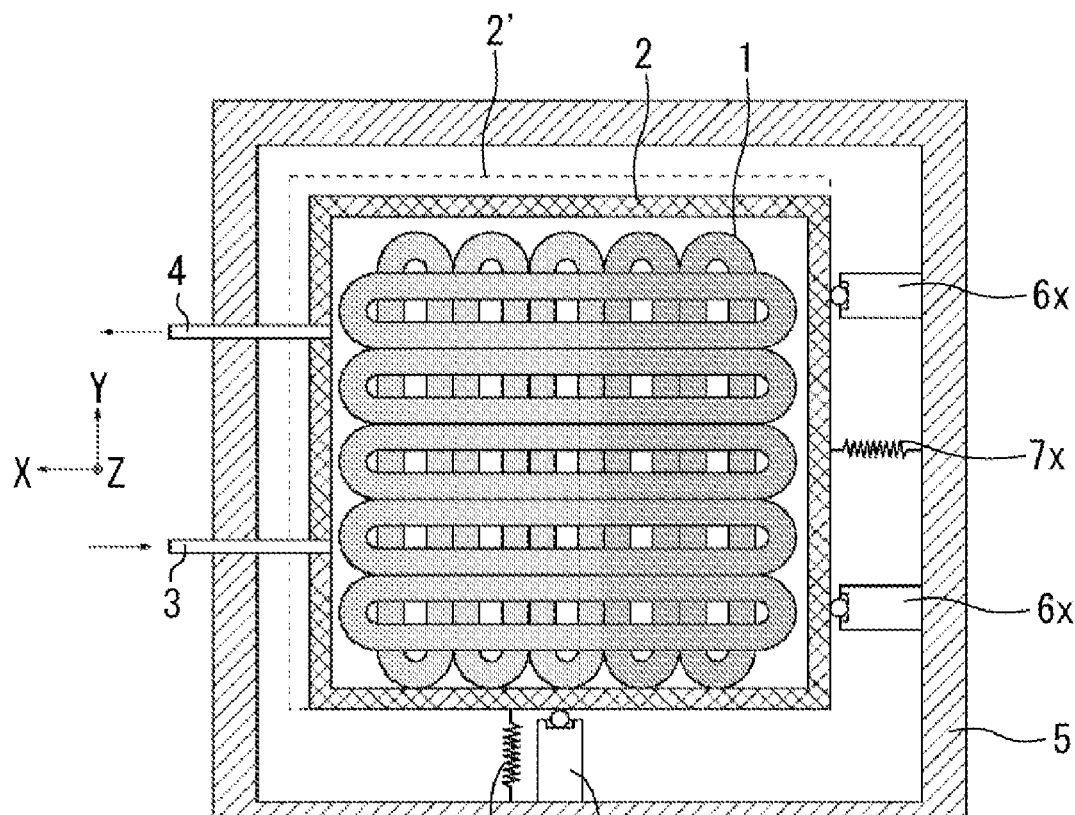
FIGS. 1A and 1B each illustrate a configuration of a driving apparatus according to a first exemplary embodiment of the present invention.
Figure 1B:
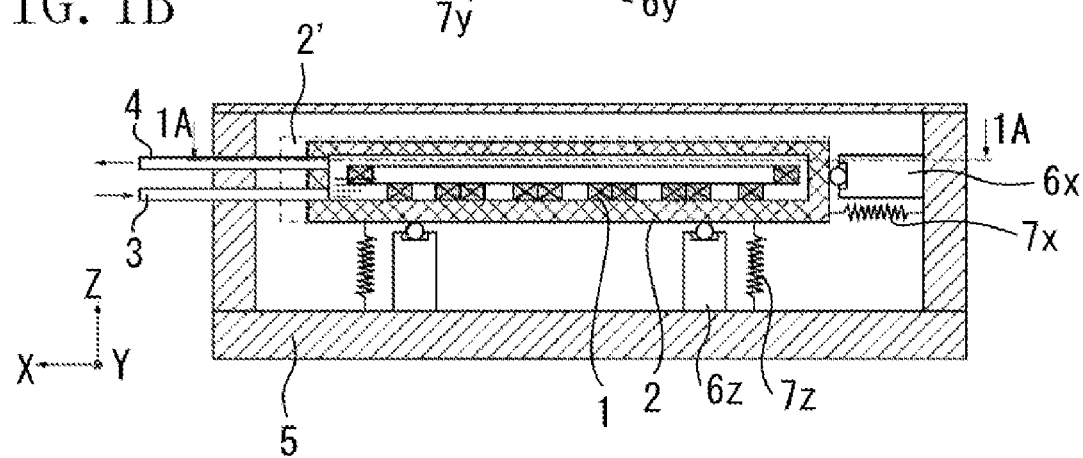

FIGS. 1A and 1B illustrate a configuration of a driving apparatus according to a first exemplary embodiment of the present invention.

A coil 1 is cooled by a cooling unit to a predetermined temperature. The coil 1 is held by a coil holding member 2. Further, the coil 1 and the coil holding member 2 are contained and held by an outer chamber or container 5 configured so that the inside thereof can be maintained in a vacuum state. The coil holding member 2 is supported by a supporting member 6z movably in an X-direction, which serves as a first direction, and in a Y-direction, which serves as a second direction. Moreover, the driving apparatus includes a first restriction member 6x, which restricts the movement in the X-direction (first direction) of the coil holding member 2, and a second restriction member 6y, which restricts the movement in the Y-direction (second direction) of the coil holding member 2. The first restriction member 6x supports the coil holding member 2 movably in the Y-direction (second direction). The second restriction member 6y supports the coil holding member 2 movably in the Y-direction (second direction). Furthermore, the driving apparatus includes also biasing means such as a pressing spring 7x and a pressing spring 7y. The pressing spring 7x is a first pressing unit for pressing the coil holding member 2 against the first restriction member 6x. The pressing spring 7y is a second pressing unit for pressing the coil holding member 2 against the second restriction member 6y.

Each of the coils 1 is substantially oval-shaped. A plurality of coils 1 are arranged by setting the major axis of the overall shape of each of the coils 1 to be in the X-direction and the Y-direction. The coils 1 are fixed to the coil holding member 2 with bolts (not shown) or by bonding. However, other generally known fixing methods can be used.

The cooling unit is an immersion cooling unit for performing immersion cooling of coils in a refrigerant using a refrigerant supply pipe 3 for supplying a refrigerant, such as liquid nitrogen or liquid helium, and a refrigerant recovery pipe 4 for recovering the refrigerant or vaporized refrigerant, as illustrated in FIGS. 1A and 1B. Alternatively, a conduction cooling unit for connecting a refrigerator to coils or a coil holding portion can be used, instead of the immersion cooling unit.

For example, in the case where the coils are manufactured using high temperature superconductive materials, such as bismuth type superconducting wires or yttrium type superconducting wires, it is necessary to cool the coils to a temperature (generally, the critical temperature of the high temperature superconductive material, which is about a liquid nitrogen temperature of 77 K), at which the coils are put into a superconductive state. In this case, a coil can be energized at low power consumption by cooling the coil. Even in the case where coils are manufactured by winding copper wires commonly used, the electric resistance value of the coil can be reduced to about $\frac{1}{10}$ by cooling the coil to, e.g., the liquid nitrogen temperature. Thus, the coil can be driven at power consumption reduced to about $\frac{1}{10}$, as compared with the power consumption at normal temperature.

Meanwhile, the outer container 5 at atmospheric temperature is vacuum-insulated from the coil 1 and the coil holding member 2, which are at low temperature, by evacuating the outer container 5 into a reduced pressure or vacuum state. Accordingly, heat penetration into the coil 1 and the coil holding member 2 can be reduced. Alternatively, a radiation shield (not shown) for suppressing radiation heat radiated from the outer container 5 at atmospheric temperature can be provided between the outer container 5 and each of the coil 1 and the coil holding member 2. In this case, heat penetration into the coil 1 and the coil holding member 2 can be reduced even more.

Each of the first restriction member 6x, the restriction member 6y, and the supporting member 6z includes, e.g., a bar-like member extending in an associated one of the X-direction, the Y-direction, and the Z-direction from the outer container 5 to the coil holding member 2, and a ball, located between and in contact with both the coil holding member 2 and the bar-like member. Thus, the coil holding member 2 at low temperature is in point-contact with the outer container 5 at ordinary temperature via the ball. Consequently, heat penetration to the coil holding member 2 can be reduced. Further, the coil holding member 2 can receive only a component in the Z-direction of a force applied from each of the bar-like members, because the coil holding member 2 is in contact with each of the bar-like members via the ball. Additionally, the coil holding member 2 can be supported movably in other directions. Alternatively, the restriction members 6x and 6y and the supporting member 6z can be configured such that the bar-like members are provided at the side of the coil holding member 2, and that the balls are in contact with the side of the outer container 5.

As long as the restriction members 6x and 6y and the supporting member 6z satisfy such requirements, any configuration of the members 6x, 6y, and 6z can be implemented. The balls are not necessarily used. A simple alternative is to use a shaft having one hemispherical end to be in point-contact with the coil holding member 2, which can move sliding on the shaft.

The position in the X-direction (first direction), the position in the Y-direction (second direction), and the position in the direction of rotation around the Z-axis of the coil holding member 2 can be determined by using a combination of at least three restriction members, i.e., at least two restriction members 6x and one restriction member 6y. On the other hand, at least three supporting members 6z are provided in the apparatus. Thus, the position in the Z-direction, the position in the direction of rotation around the X-axis, and the position in the direction of rotation around the Y-axis of the coil holding member 2 can be determined. With this configuration, the positions of the coil holding member 2, which respectively correspond to translational three axes and rotational three axes, are determined.

With this configuration, when the coil 1 and the coil holding member 2 are cooled and thermally contracted, the balls of the restriction members 6x and 6y and the supporting member 6z rotate, or the coil holding member 2 slide on the balls. Accordingly, the resistance applied to the coil holding member 2 can be reduced.

The pressing springs 7x and 7y are placed between the coil holding member 2 and the outer container 5 at the side of the restriction members 6x, 6y, and 6z. The pressing springs 7x and 7y apply a pressing force to the coil holding member 2 in a direction in which the coil holding member 2 is moveable towards the restriction members 6x, 6y, and 6z. The coil holding member 2 is always pressed against the restriction members 6x, 6y, and 6z by the pressing springs 7x and 7y. Thus, even when the coil holding member 2 is cooled, the position of a surface thereof, which contacts the restriction members 6x, 6y, and 6z, can be maintained. More particularly, dashed lines 2' illustrated in FIGS. 1A and 1B represent an outer shape of the coil holding member 2 at normal temperature. When the coil holding member 2 is cooled, the coil holding member 2 is thermally contracted to the outer shape thereof illustrated in FIGS. 1A and 1B. At that time, the positions of the coil holding member 2, which contact the restriction members 6x and 6y, are always unchanged by the pressing springs 7x and 7y. Thus, the position reference of the entire coil 1 can be maintained by treating the surfaces of the coil holding member 2, which are placed at the sides of the restriction members 6x and 6y, as reference surfaces for thermal contraction.

Thus, the coil holding member 2 is pressed against the restriction members 6x and 6y by the pressing springs during a period when the coil 1 is cooled. Before and after the cooling, the positions of the reference surfaces are maintained. Basically, before and after the cooling, the coil holding member 2 causes only expansion and contraction between the position of the coil holding member 2, which is illustrated in FIGS. 1A and 1B, and the position of the dashed line 2'. Consequently, before and after the cooling, the positions of the coil 1 and the coil holding member 2 can be restored.

As illustrated in FIGS. 1A and 1B, the restriction members 6x and 6y and the pressing springs 7x and 7y are provided only one side in each of the X-direction and the Y-direction of the outer container 5. Thus, in the case where the temperature of the coil holding member 2 abruptly rises due to problems, so that the thermal expansion thereof occurs, the coil holding member 2 can be prevented from being broken and deformed.

Meanwhile, when the coil 1 is supplied with electric current, a driving reaction force is generated by the coil 1 due to an interaction between the coil 1 and the mover magnet. When the coil 1 is energized in the coil arrangement illustrated in FIGS. 1A and 1B, driving reaction forces are generated in the X-direction, which is the first direction, and the Z-direction. Alternatively, driving reaction forces are generated in the Y-direction, which is the second direction, and the Z-direction. Thus, the coil holding member 2 receives driving reaction forces acting in the X-direction and the Z-direction or driving reaction forces acting in the Y-direction and the Z-direction from the coils.

In the case where the driving reaction force is generated in a direction in which the coil holding member 2 is caused to abut against the restriction members 6x and 6y and the supporting member 6z, the position of the coil holding member 2 can be maintained by the restriction members 6x and 6y and the supporting member 6z. On the other hand, in the case where the driving reaction forces are generated in a direction in which the coil holding member 2 is caused to be away from the restriction members 6x and 6y and the supporting member 6z, the position of the coil holding member 2 is maintained by the pressing springs 7x and 7y. That is, as illustrated in FIGS. 1A and 1B, the pressing springs 7x and 7y always press the coil holding member 2 against the restriction members 6x and 6y and the supporting member 6z. Thus, the position of the coil holding member 2 is prevented from being varied by a driving reaction force. Preferably, the pressing force is set to be larger than the driving reaction force that can be generated to act in each direction of the coil 1. Consequently, the variation in the position of the coil holding member 2 due to the driving reaction force of the coil 1 can more effectively be suppressed. Accordingly, even while the coil is driven, the desired accuracy of the position of each of the coil 1 and the coil holding member 2 can be satisfied.

Figure 12:
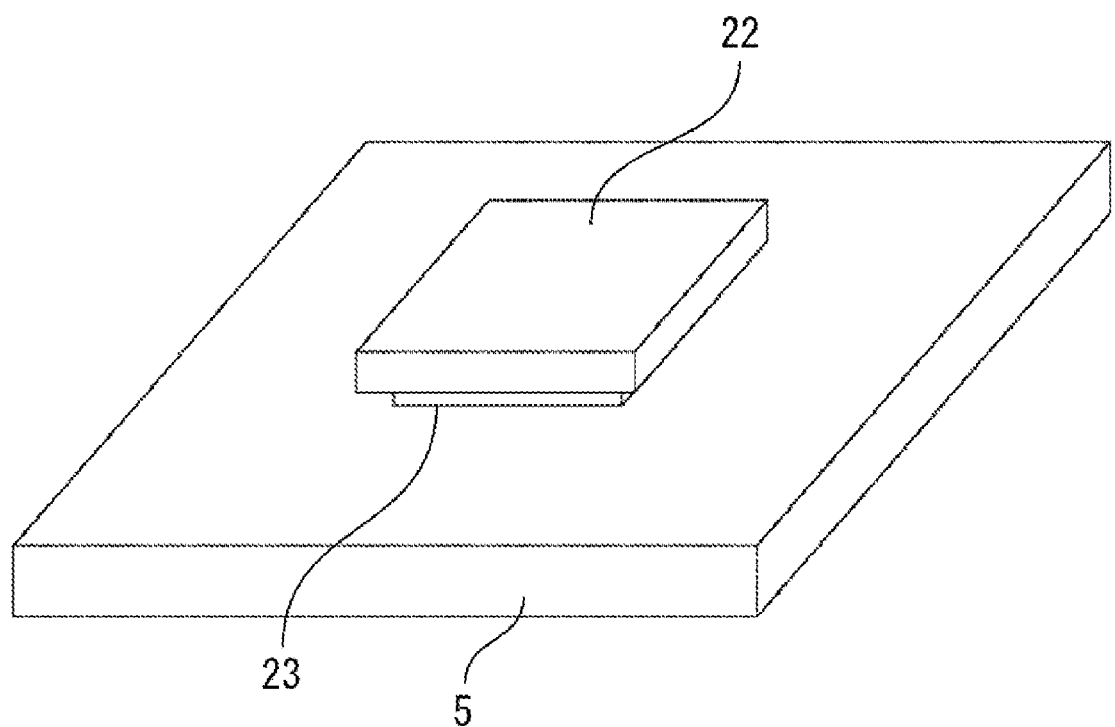
FIG. 12 illustrates a planar motor type stage using a driving apparatus according to an exemplary embodiment of the present invention.

In the case where, for example, a linear motor illustrated in FIG. 12 is used in an exposure apparatus as a driving apparatus, the driving reaction force is determined by the product of the mass of the moving part, such as the mover 22 and the mover magnet 23, and the acceleration of the mover 22. For example, in the case where the mass of the moving part is 20 kg and the maximum acceleration is 3G, the driving reaction force is 60 kgf. It is sufficient to appropriately select the pressing springs 7x and 7y such that the restoring force of each of the pressing springs 7x and 7y is larger than the driving reaction force.

However, in the case where the apparatus has an additional unit for canceling or reducing the driving reaction force, the force applied to the pressing springs 7x and 7y is reduced. Therefore, it is unnecessary to always press the coil holding member 2 with a force whose magnitude is larger than the driving reaction force. Accordingly, it is sufficient to press the coil holding member 2 with a force whose magnitude is larger than the remaining magnitude of the driving reaction force reduced by the additional unit for canceling or reducing the driving reaction force.

Although the pressing springs 7x and 7y can be placed at a side opposite to the restriction members 6x and 6y, the length of each of the pressing springs 7x and 7y may be changed when the coil holding member 2 is thermally contracted. Consequently, the pressing force may be changed. Thus, in this case, it is necessary that the pressing force in a state, in which the coil holding member 2 is thermally contracted, is set to be larger than an assumed driving reaction force. In the case where the pressing springs 7x and 7y are arranged as illustrated in FIG. 1A, the lengths of the pressing springs 7x and 7y are unchanged even when the coil 1 and the coil holding member 2 are thermally contracted. Thus, there is an advantage in maintaining the initially set pressing force.

As illustrated in FIG. 1B, the apparatus further includes a pressing spring 7z corresponding to the Z-direction for pressing the coil holding member 2 against the supporting member 6z. In the case where the assumed driving reaction force corresponding to the Z-direction is less than the combined weight of the coil 1 and the coil holding member 2, such weight serves as a pressing force against the supporting member 6z. Thus, it can be unnecessary to provide the pressing spring 7z in the apparatus.

There is no particular limit to the number of the pressing springs 7x and 7y provided in the apparatus. A plurality of pressing springs can be provided. Consequently, the position shift of the coil 1 can be prevented by pressing the coil holding member 2 using the pressing springs 7x and 7y even during a period when the mover is driven.

With the above-described configuration, the apparatus has advantages in absorbing effects of the thermal contraction of the coil, which is caused when the coil is cooled, and effects of the thermal expansion of the coil, which is caused when the coil is returned to a normal temperature. The apparatus has another advantage, in obtaining an appropriate supporting stiffness against the driving reaction force.

Figure 2A:
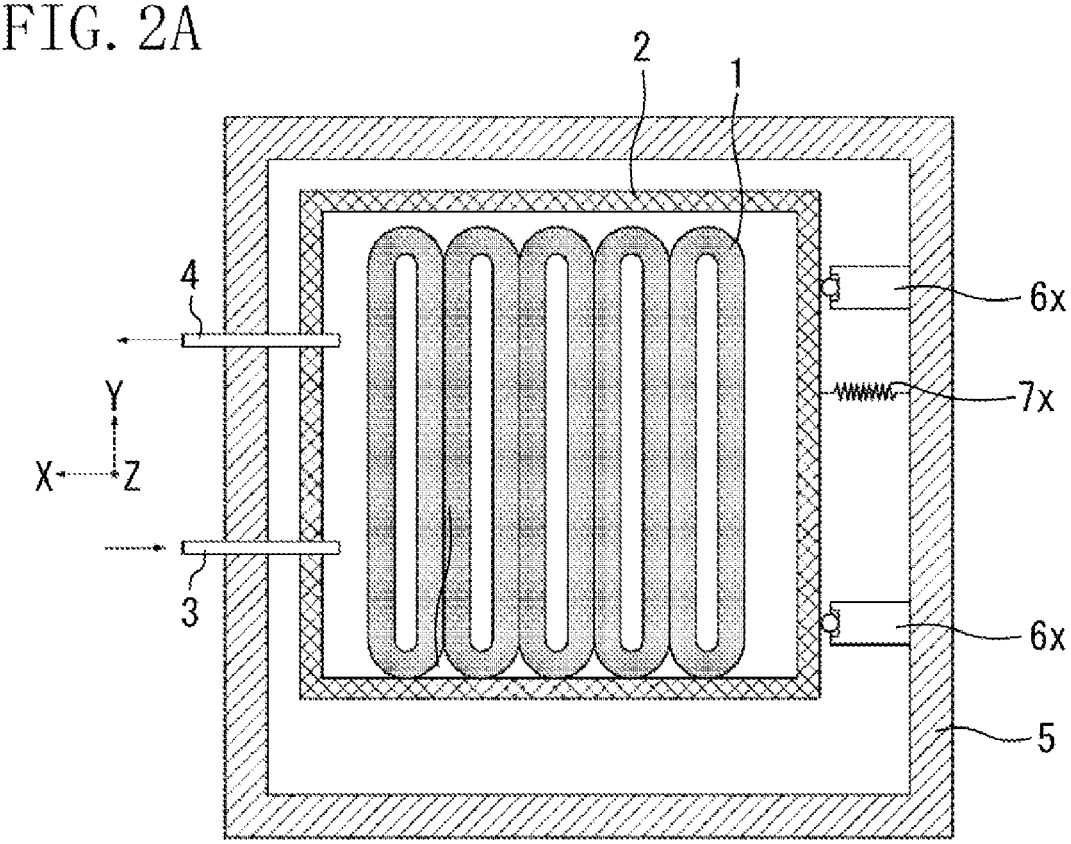
FIGS. 2A and 2B each illustrate a configuration of a driving apparatus according to a modification of the first exemplary embodiment of the present invention.
Figure 2B:
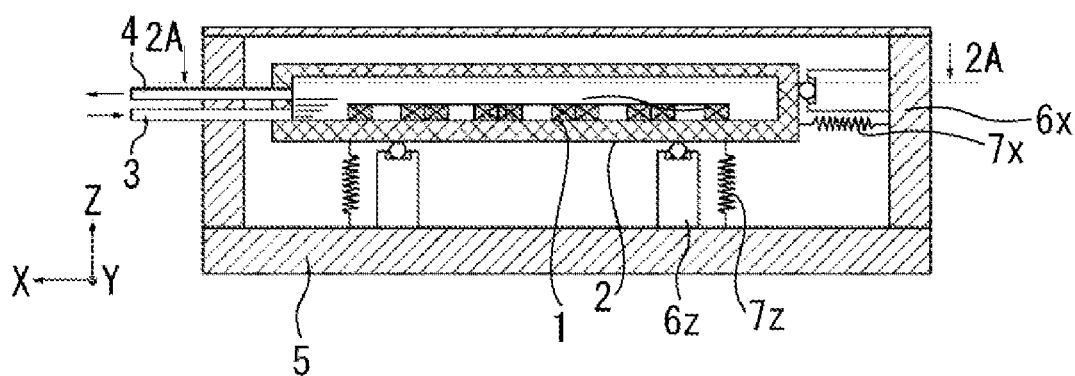

In the case where the coils 1 are arranged only in the X-direction, as illustrated in FIGS. 2A and 2B, the reaction force of the coil is generated to act in the X-direction, which is the first direction, and the Z-direction. With this coil configuration, no driving reaction force is generated to act in the Y-direction, which is the second direction. Thus, it is not necessary to provide the second restriction member for restricting the coil holding member 2 from moving in the Y-direction, which is the second direction. Thus, the following configuration can be set. That is, the coil holding member 2 is supported by the supporting member 6z, which supports the coil holding member 2 movably in the X-direction, which is the first direction, and the Y-direction, which is the second direction. Additionally, the apparatus includes also the first restriction member 6x, which restricts the coil holding member 2 from moving in the X-direction, which is the first direction, and which supports the coil holding member 2 movably in the Y-direction, which is the second direction. The apparatus includes also at least three supporting members 6z. Consequently, the position in the Z-direction, the direction of rotation around the X-axis, and the direction of rotation around the Y-axis of the coil holding member 2 can be defined. On the other hand, the apparatus includes also at least two restriction members 6x. Thus, the position of rotation around the Z-axis of the coil holding member 2 can be defined. With this configuration, the positions of the translational two axes (respectively corresponding to the X-direction and the Z-direction) and the positions of the rotational three axes of the coil holding member 2 corresponding to the driving reaction force can be defined.

Even with this configuration, similar to a method of supporting the coil, which is illustrated in FIGS. 1A and 1B, a coil supporting method can be provided, according to which thermal contraction at the cooling of the coil and thermal expansion at the return of the coil to normal temperature can be absorbed, and an appropriate support stiffness can be given to the coil against the driving reaction force.

Figure 3:
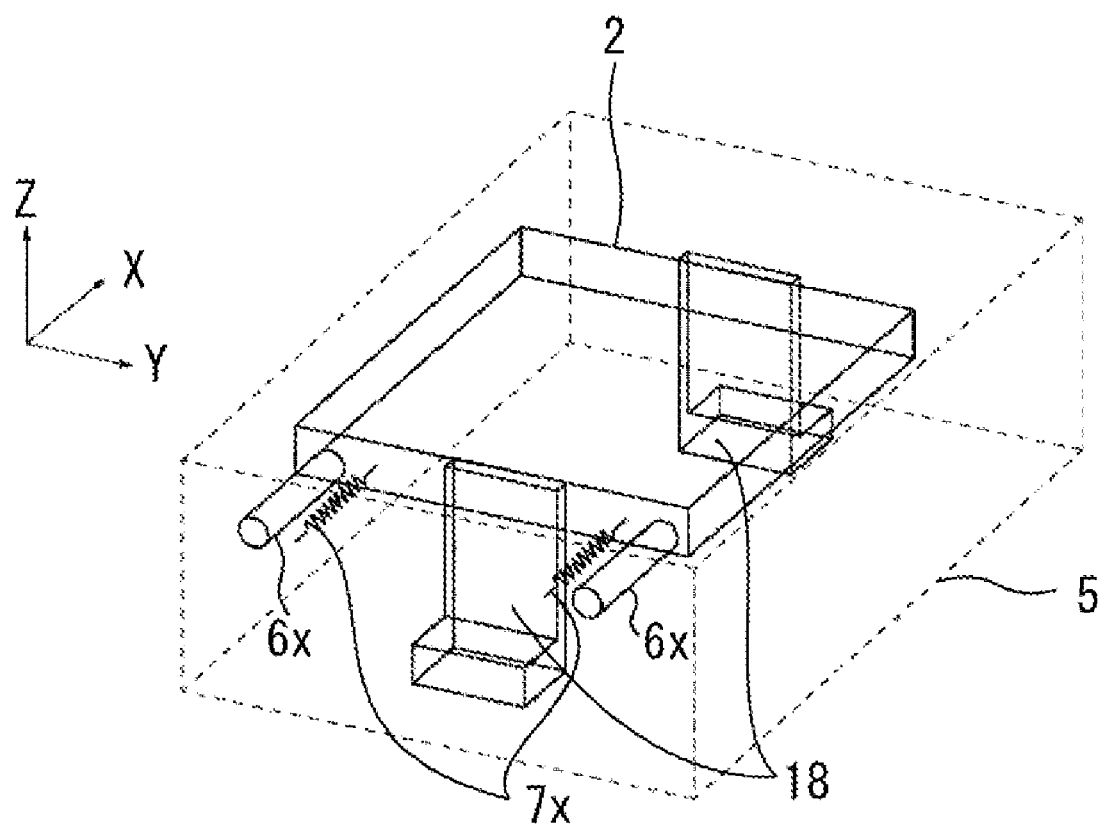
FIG. 3 illustrates a configuration of a driving apparatus according to another modification of the first exemplary embodiment of the present invention.

FIG. 3 illustrates another modification of the present embodiment, in which the coil holding portion 2 for fixedly holding the coil (not shown) is supported by a plate spring 18 whose stiffness in the X-direction serving as the first direction is lower than the stiffness in the other directions. Further, this modification includes the restriction member 6x for restricting the coil holding member 2 from moving in the X-direction serving as the first direction, and the pressing spring 7x for pressing the coil holding member 2 against the restriction member 6x. As illustrated in FIG. 3, a plurality of plate springs 18 can be provided in the apparatus. Alternatively, the plate spring 18 can be provided corresponding only to surfaces that are not in contact with the restriction member 6x. Additionally, a plurality of restriction members 6x illustrated in FIG. 3 can be provided. Alternatively, only one restriction member 6x can be provided.

In the case where the coil holding member 2 and the coil (not shown) fixedly held by the coil holding member 2 are cooled by the cooling unit to a low temperature in this modification and, thus, thermal contraction is caused, the plate spring 18 is deformed in the X-direction to avoid adverse influence of the thermal contraction. The coil holding member 2 is freely thermally contracted in the Y-direction with respect to the bonding point between the coil holding member 2 and each of the plate springs 18. On the other hand, in the X-direction, the coil holding member 2 is supported by the pressing spring 7x in a state in which the coil holding member 2 is made by the pressing springs 7x to always abut against the restriction member 6x. The plate springs 18 are deformed to avoid adverse influence of the thermal contraction of the coil holding member 2.

In the case where a coil driving reaction force is generated, variation in the position in the Y-direction and the Z-direction of the coil holding member 2 is suppressed due to the stiffness of each of the plate springs 18. It is sufficient to appropriately set the stiffness in each of the Y-direction and the Z-direction of the plate spring 18 to allow the deformation of the coil holding member 2 when the coil holding member 2 receives the coil driving reaction force. A plurality of plate springs 18 can be provided. On the other hand, variation in the X-direction of the position of the coil holding member 2 is suppressed by the restriction member 6x and the pressing spring 7x. Variation in the position, which is caused around the X-axis and the Y-axis, of the coil holding member 2 can be suppressed due to the stiffness of each of the plate springs 18. Additionally, variation in the position of the coil holding member 2, which is caused around the Z-axis, can be suppressed by two restriction members 6x.

With such a configuration, thermal contraction at the cooling of the coil and thermal expansion at the return of the coil to normal temperature can be absorbed. In addition, an appropriate support stiffness can be given to the coil against the driving reaction force.

Figure 4:
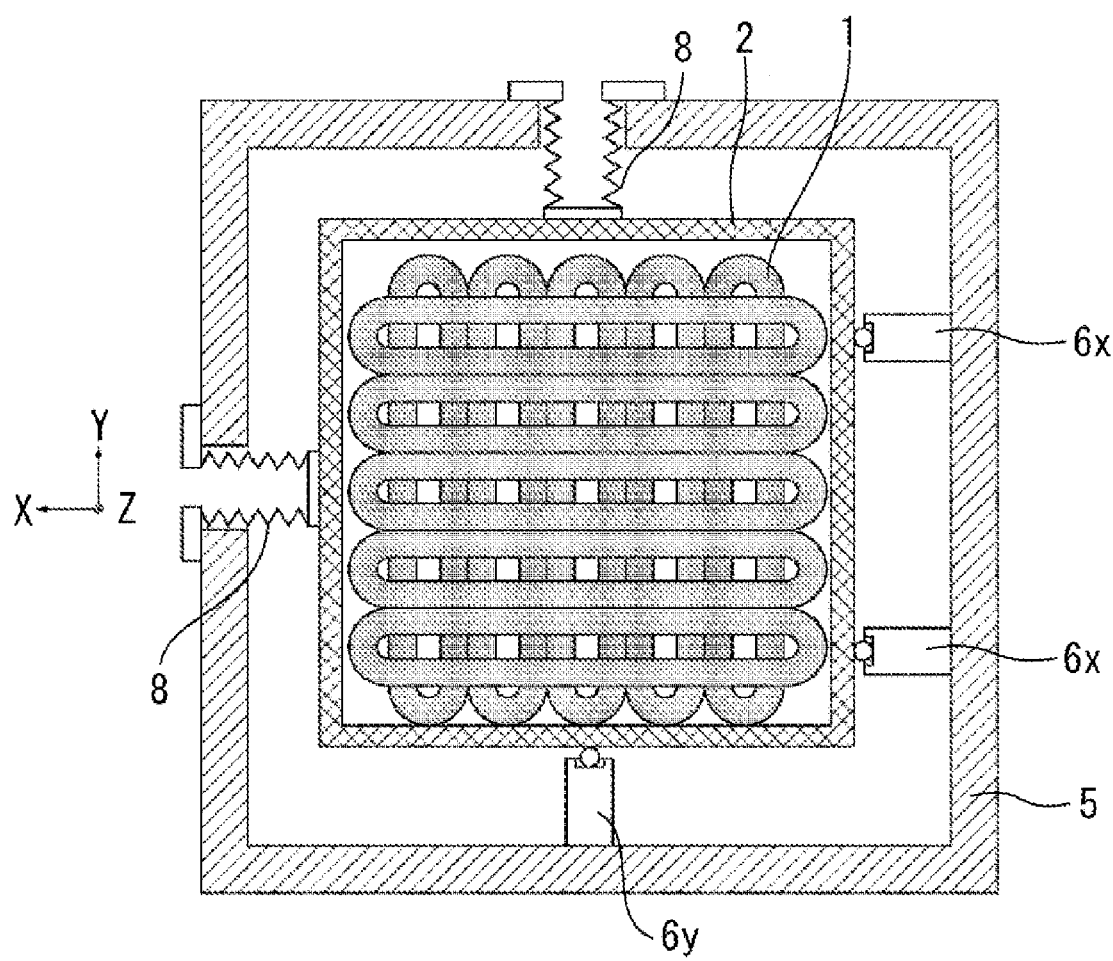
FIG. 4 illustrates a configuration of a driving apparatus using bellows as a pressing means.

FIG. 4 illustrates a configuration of a driving apparatus using bellows 8 as a biasing means (pressing unit) The bellows 8 are connected to the coil holding member 2 from the outer container 5. Each of the bellows 8 is positioned at a place opposed to a surface of the coil holding member 2 that contacts an associated one of the restriction members 6x and 6y. When the inside of the outer container 5 is evacuated, the coil holding member 2 can be abutment-held by applying a pressing force, which is generated due to a differential pressure between the atmosphere and the partial vacuum in the container, onto the restriction members 6x and 6y. In the case where a spring constant of each of the bellows 8 is set at a low value, the pressing force is generated mainly due to the differential pressure. Thus, a substantially constant pressing force can be applied thereto.

Figure 5:
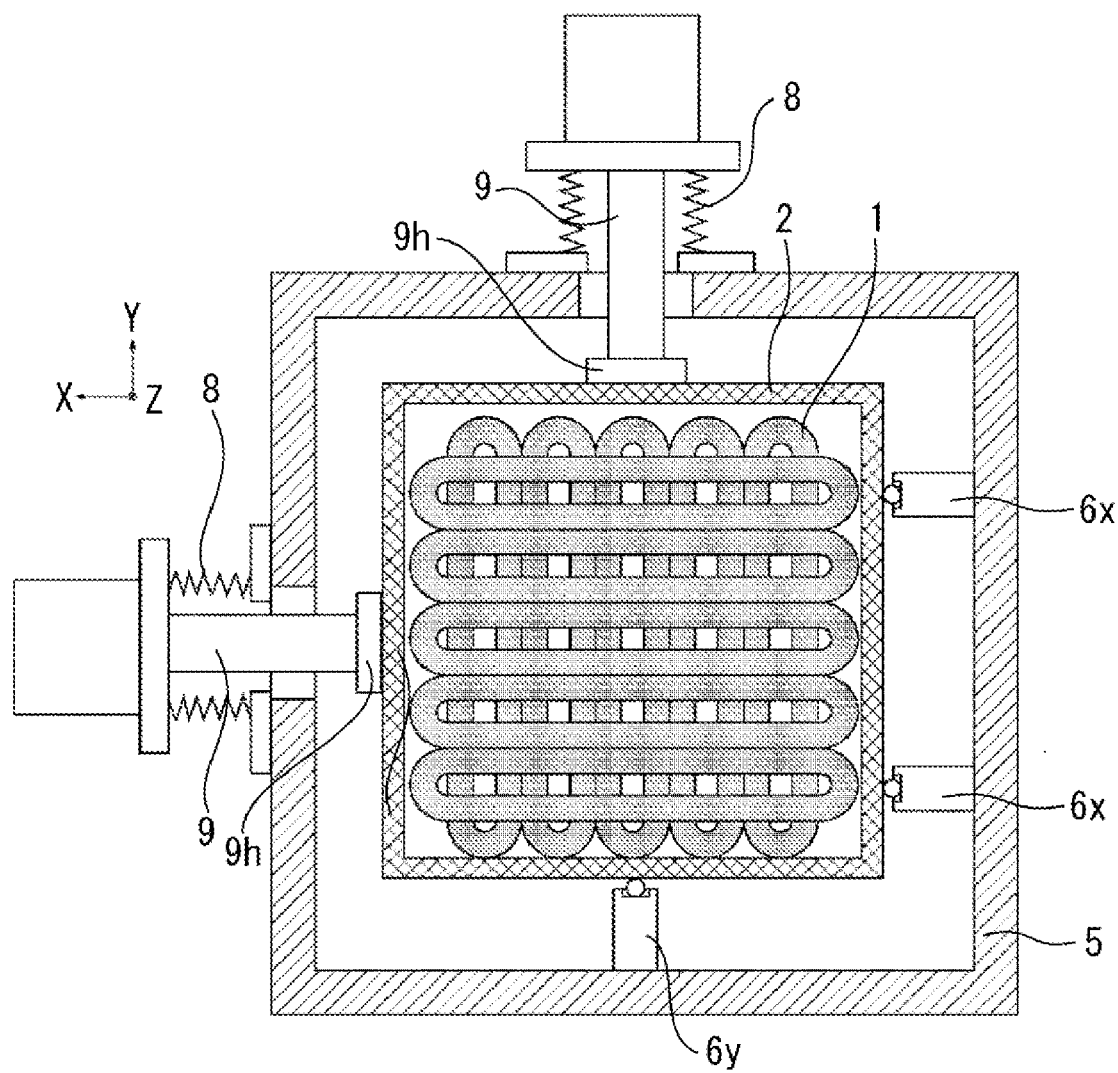
FIG. 5 illustrates a driving apparatus using refrigerators.

FIG. 5 illustrates a driving apparatus having an outer container 5, to which refrigerators are attached via the bellows 8.

A low temperature unit 9h of each of the refrigerators 9 is in contact with a surface of the coil holding member 2 that is opposite to a surface thereof contacting the restriction members 6x and 6y. When the inside of the outer container 5 is evacuated, a force is generated, which presses the refrigerators 9 towards the inside of the outer container 5 due to the differential pressure. The present embodiment utilizes this force as a pressing force for pressing the coil holding member 2 to the restriction members 6x and 6y. Moreover, the low temperature unit 9h of each of the refrigerators 9 can be always connected to the coil holding member 2 with the pressing force. Thus, a thermal contact resistance of a connection portion between the coil holding member 2 and the low temperature unit 9h of each of the refrigerators 9 can be reduced. Consequently, the present embodiment has an advantage in efficiently lowering the temperature of each of the coil holding member 2 and the coils 1.

Figure 6:
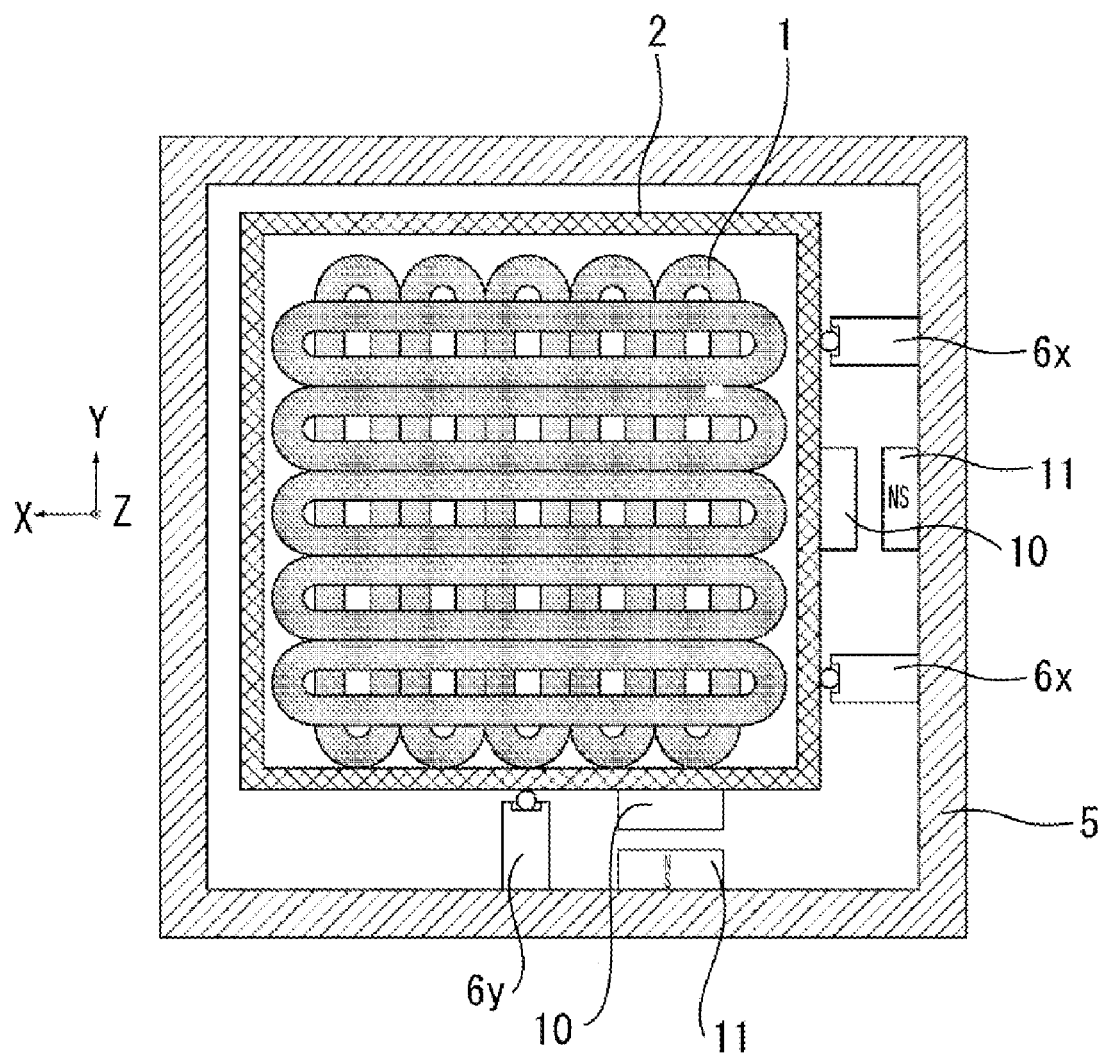
FIG. 6 illustrates a configuration of a driving apparatus using a magnetic force in the pressing means.

FIG. 6 illustrates a configuration of the driving apparatus using a magnetic force in the biasing means (pressing unit). In the driving apparatus illustrated in FIG. 6, a magnetic body 10 made of iron or the like is provided on a side surface of the coil holding member 2. Magnets 11 are provided on the inner surfaces of the outer container 5. Thus, a magnetic attraction force acting between the magnetic body 10 and each of the magnets 11 is used as a pressing force. As long as the magnitude of the magnetic attraction force has a desired value, the magnets 11 can be provided on the outer surfaces of the outer container 5. Alternatively, electromagnets can be used instead of permanent magnets. Alternatively, permanent magnets can be provided on the coil holding member 2, while a magnetic body can be provided on the inner surface of the outer container 5. In addition, the magnetic body 10 can be replaced with a permanent magnet. Alternatively, an electromagnet can be used instead of the magnetic body 10. Alternatively, an electromagnet can be provided on the coil holding member 2 instead of the magnetic body 10, so as to make an electromagnetic actuator. Alternatively, a permanent magnet can be provided on a side of each of the coil holding member 2 and the outer container 5, which is opposite to an associated one of the restriction members 6x and 6y. Thus, a repulsive force acting between the magnets can be used as the pressing force.

In the case where a magnetic force is used in such a way, a pressing force can be contactlessly applied among the outer container 5, which is at normal temperature, and the coil 1 and the coil holding member 2, which are at low temperature. Thus, heat penetration due to the thermal conductivity of the pressing unit towards the low temperature side can be substantially reduced. Consequently, in the case where the coil 1 is cooled using a refrigerant, a necessary amount of the refrigerant can be reduced. In the case where the coil 1 and the coil holding member 2 are cooled using the refrigerators, the present embodiment has an advantage in reducing the thermal load. In the case where the thermal load of the refrigerator can be reduced, the achieved temperature of the coil 1 by cooling can be further reduced. Accordingly, power consumption can be reduced.

Meanwhile, variation in the spring constant and initial values may be caused by changes in the temperature of the member for generating a pressing force. In the case where the pressing unit is a spring, changes in Young's modulus, and changes in length due to the thermal contraction are causes for changes in the pressing force. In the case where a magnetic force is used as the pressing force, a change in the magnetic permeability of the magnetic body and a change in the magnetic flux density of the magnet are causes for change in the pressing force. In the case where the magnitude of the pressing force is less than a predetermined value, the position of the coil holding member 2 varies when a coil driving reaction force is applied. Thus, a desired driving force is not obtained. Consequently, it is considered that the positioning accuracy or the like of a stage mover is affected. On the other hand, in the case where the pressing force has an excessive value with respect to the predetermined value, breakage or the like of the restriction members and the pressing unit may occur.

FIG. 7A illustrates a configuration of the driving apparatus including the restriction member 6x provided with a strain gauge 12 for measuring the pressing force, a measurement instrument 15 for obtaining the pressing force from an output of the strain gauge 12, and a feed-through 13, which connects the strain gauge 12, which is in a vacuum, to the measurement instrument 15 in the atmosphere. Consequently, it can be measured what magnitude of the pressing field is applied from the coil holding member 2 to the restriction member 6x by the pressing unit (using a magnetic force acting between the magnet 11 and the magnetic body 10). In the case where the magnitude of the pressing force is too large or too small, the magnetic attraction force can be changed by adjusting the position of the magnet 11 using an adjusting screw 14, based on a result of the measurement. Thus, the pressing force can be adjusted.

Although the strain gauge 12 is used as an example of a pressing force measurement unit, another unit, such as a load cell, can be used. Further, a pressing spring can be used as the pressing unit. In this case, the position of an end of the pressing spring can be adjusted using an adjusting screw. However, as long as the pressing force can be adjusted, any pressing force adjustment means can be used. In the case where the magnet 11 is provided on the outer side of the outer container 5, as illustrated in FIGS. 7A and 7B, it is unnecessary to penetrate the outer container. Consequently, the adjustment unit can be provided using a relatively simple configuration.

The pressing force can be controlled by adding a controller 16 and a drive unit 17 for the adjusting screw 14 to the apparatus, as illustrated in FIG. 7B, so as to always maintain the magnitude of the pressing force at a desired level.

However, the pressing force can be adjusted by measuring the position of the coil holding member 2 and determining whether the position of the coil holding member 2 changes in a state in which the coil holding member 2 receives a driving reaction force. For example, the distance of the coil holding member 2 from the outer container 5 is measured using a gap sensor or the like. In the case where the pressing force is insufficient, the coil holding member 2 receives a driving reaction force and changes the position thereof. In such a case, it is useful to increase the pressing force until the position of the coil holding member 2 does not change even when the coil holding member 2 receives a driving reaction force.

Second Exemplary Embodiment

Figure 8:
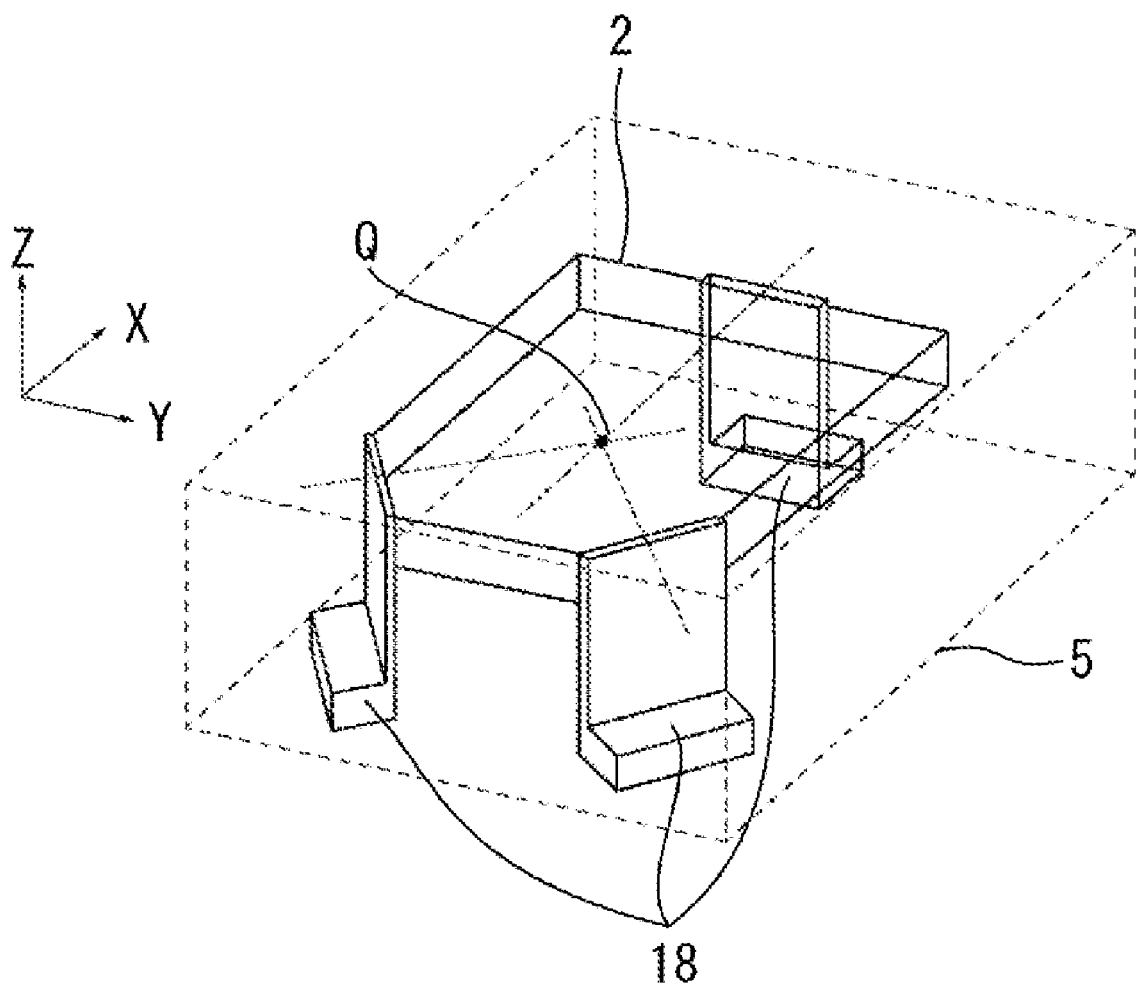
FIG. 8 illustrates a configuration of a driving apparatus according to a second exemplary embodiment of the present invention.

FIG. 8 illustrates a configuration of a driving apparatus according to a second exemplary embodiment of the present invention.

As illustrated in FIG. 8, a coil (not shown) fixedly held in the coil holding member 2 is cooled by a cooling unit (not shown) to a desired temperature. The coil holding member 2 is held in the outer container (chamber) 5. In the configuration illustrated in FIG. 8, the coil holding member 2 is supported by three plate springs 18, each of which is adapted so that the stiffness thereof in one direction is lower than the stiffness thereof in the other two directions. The three plate springs 18 are disposed in an equally-spaced manner such that a low-stiffness direction, in which stiffness is lower than stiffness in the other directions, of each plate spring 18 forms an angle of substantially 120 degrees with a low-stiffness direction, in which stiffness is lower than stiffness in the other directions, of each of the other two plate springs 18.

In the apparatus of this configuration, even in the case where the entire coil holding member 2 is cooled and is thermally contracted, each of the plate springs 18 deforms in a direction, in which the stiffness thereof is low, to be able to safely avoid adverse influence of the thermal contraction of the coil holding member 2. A specified point (e.g., point Q illustrated in FIG. 8) of thermal contraction of the coil holding member 2 is the center position of thermal contraction of the coil holding member 2. The specified point of thermal contraction of an object is a starting point of thermal contraction of the object. The location of the specified point of thermal contraction is substantially unchanged by thermal contraction. Thermal contraction of the coil holding member 2 is caused around and is developed towards the specified point Q. Accordingly, in the case where the direction, in which stiffness is low, of each plate spring 18 is set to be in a direction of the center position of thermal contraction of the coil holding member 2, the plate springs 18 can support the coil holding member 2 while avoiding adverse influence of the thermal contraction of the coil holding member 2. As long as there is the reproducibility of the specified point of thermal contraction, after the coil is cooled to a low temperature, the position of the coil can be determined by treating the specified point of thermal contraction as the position reference of the coil. Actually, the arrangement of the plate springs 18 may deviate due to manufacturing error or an assembling error. Thus, the specified point Q of thermal contraction of the coil holding member 2, which is a reference point, may deviate from a designed value. In this case, after the apparatus is fabricated and is first cooled, data representing the position of the coil is acquired by measuring the position thereof. Consequently, the position reference of the coil can be obtained. The reproducibility of the position of the coil may vary according to variation in the cooling rate and the temperature of each component that is being cooled. However, it is useful to preliminarily check the reproducibility of the position of the coil and to cool the coil according to a method capable of obtaining the reproducibility thereof.

The three plate springs 18, which are arranged such that each of the low-stiffness directions of the plate springs 18 forms an angle of substantially 120 degrees with each of the low-stiffness directions of the other two plate springs 18, as illustrated in FIG. 8, have high stiffness against an external force. Thus, the stiffness of the coil against a driving reaction force can be set at a high value. Accordingly, even in the case where a coil driving reaction force is generated, the positional accuracy of the coil holding member 2 can be maintained at high level.

As described above, the coil holding member 2 is supported by the three plate springs 18 arranged such that each of the low-stiffness directions of the plate springs 18 forms an angle of substantially 120 degrees with each of the low-stiffness directions of the other two plate springs 18. Consequently, the adverse influence of deformation due to the thermal contraction of the entire coil holding member 2 can be avoided. The stiffness of the coil holding member 2 against a coil driving reaction force serving as an external force can be maintained at high level.

However, as long as the stiffness in the direction of the center (specified point) of thermal contraction of the coil holding member 2 is set to be lower than that in each of the other directions thereof, a method of arranging the plate springs is not necessarily established such that each of the low-stiffness directions of the plate springs forms an angle of substantially 120 degrees with each of the low-stiffness directions of the other two plate springs. Additionally, the number of the plate springs for supporting the coil holding member 2 is not necessarily three. For example, N plate springs can be used such that each of the low-stiffness directions of the plate springs forms an angle of substantially 360/N degrees with each of the low-stiffness directions of the other two plate springs.

Third Exemplary Embodiment

Figure 9A:
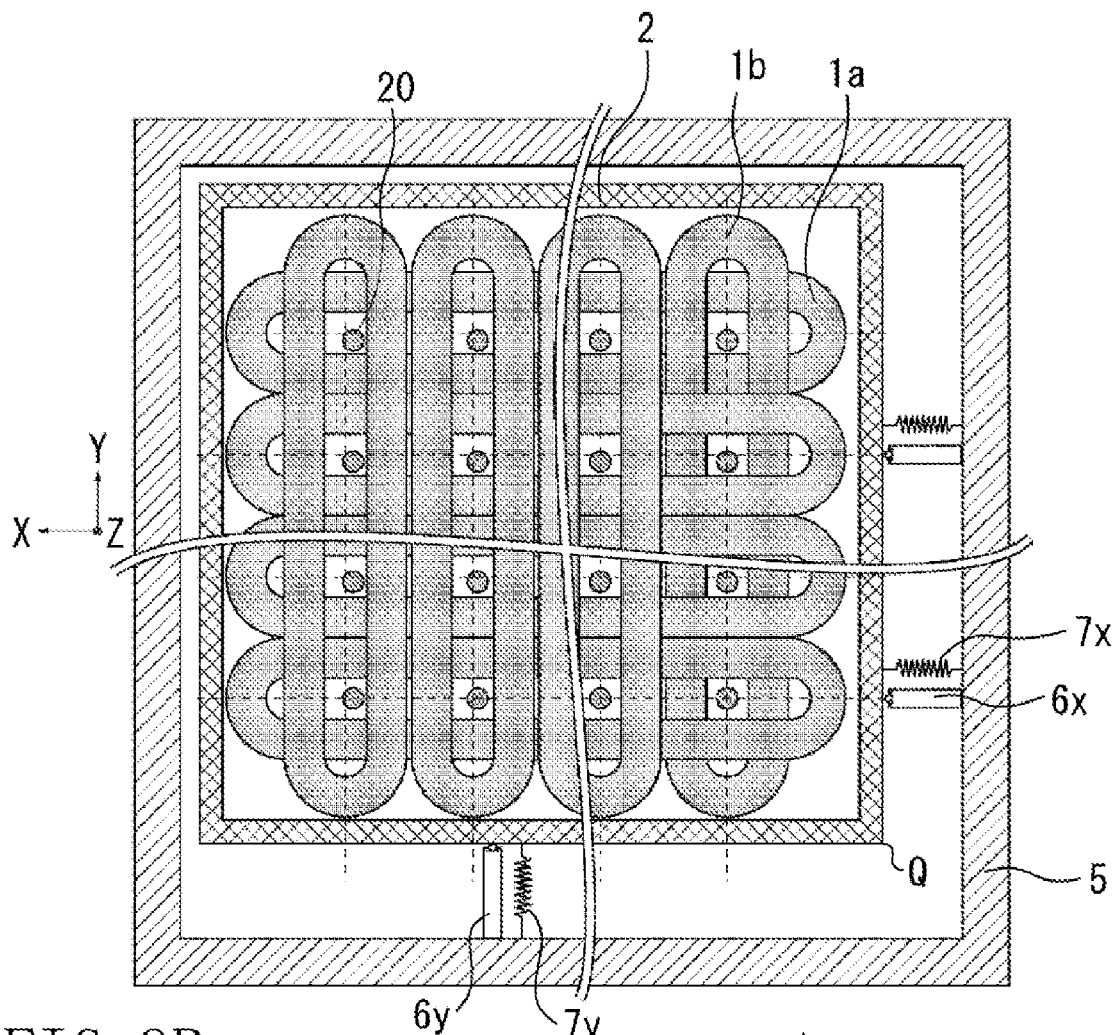
FIGS. 9A and 9B each illustrate a configuration of a driving apparatus according to a third exemplary embodiment of the present invention.
Figure 9B:
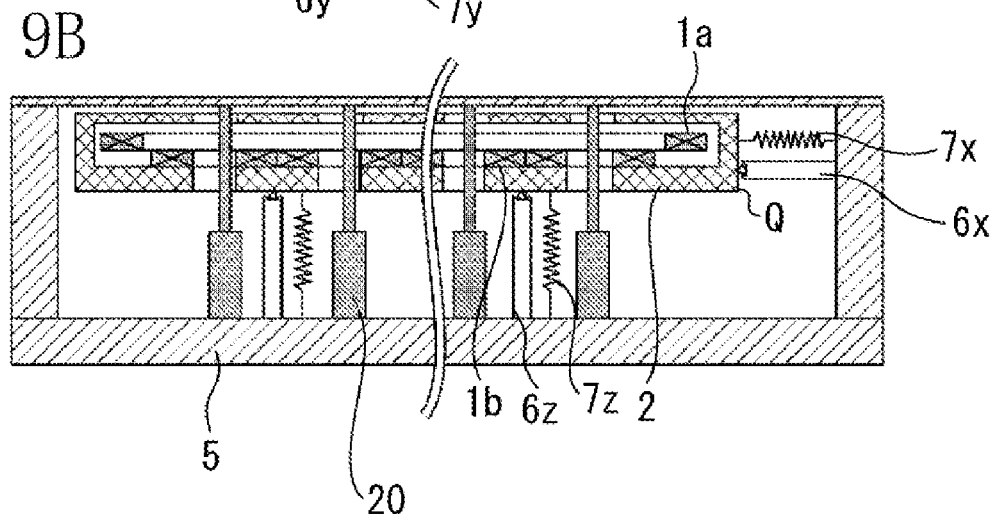

FIGS. 9A and 9B illustrate a configuration of a driving apparatus according to a third exemplary embodiment of the present invention. The coil 1 is cooled by a cooling unit to a desired temperature. Then, the coil 1 is held by the coil holding member 2 and is held in the outer container 5. The coil holding member 2 is supported by a supporting member 6z movably in an X-direction, which corresponds to the first direction, and a Y-direction, which corresponds to the second direction. The apparatus further includes a first restriction member 6x for restricting the movement in the X-direction, which corresponds to the first direction, and a second restriction member 6y for restricting the movement in the Y-direction, which corresponds to the second direction. The first restriction member 6x supports the coil holding member 2 movably in the Y-direction (second direction). The second restriction member 6y supports the coil holding member 2 movably in the Y-direction (second direction). Further, the driving apparatus includes also a pressing spring 7x and a pressing spring 7y. The pressing spring 7x is a first pressing unit (biasing means) pressing the coil holding member 2 against the first restriction member 6x. The pressing spring 7y is a second pressing unit pressing the coil holding member 2 against the second restriction member 6y.

Meanwhile, the top wall of the outer container 5 receives a differential pressure and is greatly deformed towards the coil 1. When the top wall of the outer container 5 is greatly deformed and contacts the coil 1 or the coil holding member 2, which is cooled to low temperature, heat is conducted to the coil 1 from a contact portion between the top wall and the coil 1 or the coil holding member 2, and the rise of the temperature of the coil 1 occurs. Conversely, because heat is removed from the top wall of the outer container 5, the temperature of the outer container 5 falls. When heat is transferred to a moving stage by heat transfer or radiation, the thermal deformation or the like of the moving stage occurs. Accordingly, the positioning accuracy may be adversely affected.

Thus, the apparatus is provided with a shaft member 20 for suppressing deformation due to the differential pressure of the top wall of the outer container 5. The shaft member 20 connects the top wall and the bottom wall of the outer container 5 and extends through a hollow portion of the coil 1. Two layers, i.e., upper and lower layers, of coils 1 are placed so that a large number of substantially oval coils 1 are provided and arranged in the direction of a plane, and that the major axes of the overall shapes of the coils 1 are set to be orthogonal to each other. Thus, it is necessary to locate the shaft member 20 in a region in which the hollow portions of an upper layer coil 1a and a lower layer coil 1b overlap each other.

Because the shaft member 20 is connected to the outer container 5 at normal temperature, basically, the shaft member 20 is provided at normal temperature. On the other hand, the coil 1 is cooled to low temperature. Thus, similar to the top wall of the outer container 5, the shaft member 20 is not allowed to contact the coil 1 and the coil holding member 2.

Meanwhile, in a planar motor type stage in an exposure apparatus, the mover is driven with a desired stroke. Thus, the size of a stator coil may exceed 1000 mm.

When a stator coil having such a large size is cooled to a low temperature, the stator coil is thermally contracted by the size of the order of mm in the longitudinal direction of the coil 1, as compared with the size thereof at normal temperature. More particularly, when the temperature falls down from normal temperature (about 300 K) to a temperature lower than 100 K, the coil, whose coil wire is made of a metal material, such as stainless steel, aluminum, copper, or silver, is thermally-contracted about 0.3%. An epoxy resin or the like is thermally-contracted about 1.0%. In the case where the wire of a coil is 1000 mm in length and the coil is assumed to be thermally contracted about 0.3%, a reduction in the length of the thermally-contracted coil is about 3 mm.

In the case where such a large reduction in size of the coil is caused by thermal contraction, it is necessary for maintaining the shaft member 20 in a state, in which the shaft member 20 does not contact the coil 1 and the coil holding member 2, to ensure a large gap therebetween. In the case where the dimension of the hollow portion of the coil 1 is small, it is considered that the diameter of the shaft member 20 is set to be small. However, the shaft member 20 should have a sufficient diameter for preventing buckling of the shaft member 20 from occurring with respect to a compression force due to the differential pressure.

A direction, in which the coil 1 and the coil holding member 2 are thermally contracted, is determined by a structure for supporting the coil 1 and the coil holding member 2. Referring to FIGS. 9A and 9B, a thermally-contraction specified point on an XY-plane is a point of intersection (point Q) of an X-side end surface and a Y-side end surface of the coil holding member 2, which are at the sides of the restriction member 6x and 6y. The thermal-contraction specified point is a starting point of the thermal contraction of an object. The location of the specified point of thermal contraction is substantially unchanged by thermal contraction. Thermal contraction of an object is caused around the thermal-contraction specified point in a radial direction of the specified point Q.

Thus, in the configuration illustrated in FIGS. 9A and 9B, the shaft member 20 and the two coil layers 1 are provided such that the center position of the hollow portion of each of the upper layer and the lower layer of coils 1 deviates from the shaft member 20 in a direction in which thermal contraction of the coil 1 is performed at normal temperature. More particularly, the shaft member 20 is configured by being shifted in a direction in which as the shaft member 20 is away from the thermal-contraction specified point or the center position Q of thermal-contraction of the coil holding member 2, the center position of the shaft member 20 gradually becomes closer to the center position of the hollow portion of each of the coils 1 with decreasing temperature. Consequently, even when the coil 1 and the coil holding member 2 are greatly thermally contracted, occurrence of interference among the coil 1, the coil holding member 2, and the shaft member 20 can be prevented while the diameter of the shaft member 20 is maintained at a value sufficient to prevent buckling. Incidentally, the expression the "center position" of the hollow portion represents the position of the center point in the hollow portion region of the upper and lower layer coils 1.

Thus, the gap between the coil 1 and the shaft member 20 in a direction, in which the coil holding member 2 is thermally contracted, can be set large as compared with the gap in the case where the center position of the hollow portion of the coil 1 and the shaft member 20 is set to be substantially the same as the center position of the shaft member 20. Thus, a large thermally-contracted amount can be allowed.

FIGS. 10A1, 10A2, 10B1, and 10B2 illustrate the relationship between the position of each of the coils 1 and the shaft members 20 in a state before thermal contraction, and the position of each of the coil 1 and the shaft member 20 in a state after the thermal contraction is performed. FIG. 10A1 illustrates the case where the center position of the hollow portion of the coil 1 is set to be the same as that of the shaft member 20 at normal temperature. When the coil 1 is cooled to low temperature in this state by setting the position of the point Q as that of the thermal-contraction specified point, the coil 1 is thermally contracted by ΔI as illustrated in FIG. 10A2. A thermally-contacted amount has the largest value at a point that is distant from the thermally-contraction specified point. It is necessary for maintaining the state, in which the coil 1 does not contact the shaft member 20 even at low temperature, that the dimension of the hollow portion of the coil 1 is d1.

On the other hand, FIG. 10B1 illustrates the case where the coil and the shaft member 20 are placed so that the center position of the hollow portion of the coil 1 differs from the center position of the shaft member 20 at normal temperature. More particularly, the shaft member 20 is placed by being shifted in a direction in which the coil 1 is thermally contracted. When the coil 1 is cooled to low temperature in this state by setting the position of the thermal contraction specified point at the point Q, similarly, the coil 1 is thermally-contracted by ΔI as illustrated in FIG. 10B2. However, the necessary dimension d2 of the hollow portion of the coil 1 for maintaining the state, in which the coil 1 does not contact the shaft member 20 even at low temperature, can be smaller than the dimension d1 due to effects of differentiating the center position of the hollow portion of the coil 1 and the center position of the shaft member 20.

Conversely, in the case where the dimension of the hollow portion of the coil 1 is fixed, the diameter of the shaft member 20 can be increased by shifting the center position thereof.

Figure 11:
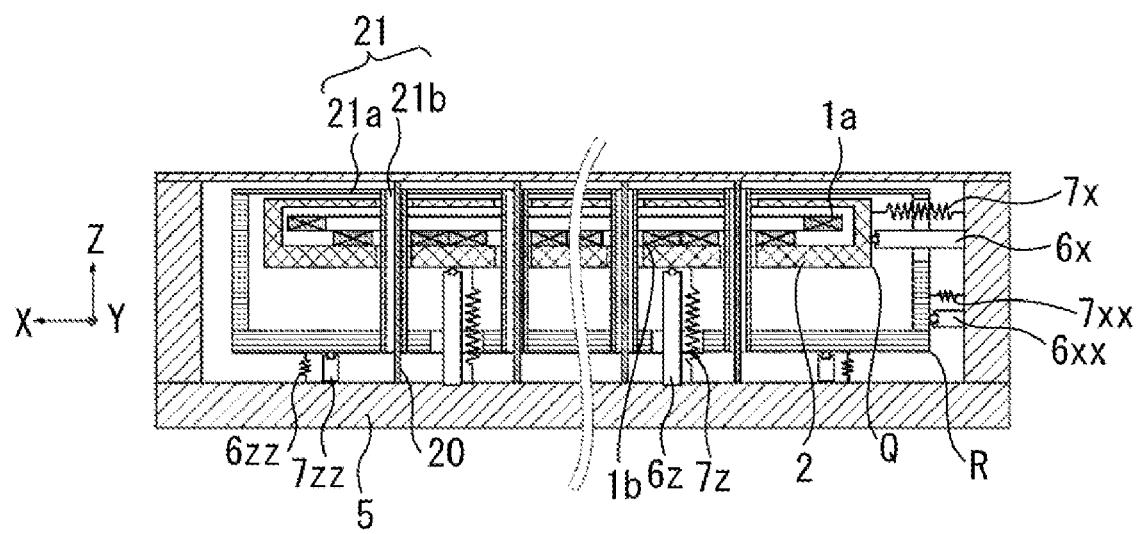
FIG. 11 illustrates a configuration of a driving apparatus according to a modification of the third exemplary embodiment.

Next, the following case is described below, in which a radiation shield 21 for suppressing heat exchange due to heat radiation between the outer container 5 at normal temperature and each of the coil 1 and the coil holding member 2 is provided in the apparatus, as shown in FIG. 11. The radiation shield 21 includes a plate-like member 21a provided between the outer container 5 and each of the coil 1 and the coil holding member 2, and an approximately pipe-like member 21b provided between the shaft member 20 and each of the coil 1 and the coil holding member 2.

The effects of suppressing radiation heat radiated from the outer container 5 at normal temperature to the coil holding member 2 are increased by making the temperature of the radiation shield 21 closer to the temperature of each of the coil 1 and the coil holding member 2. Thus, the radiation shield 21 is cooled to lower temperature. At that time, similarly, thermal contraction occurs in the radiation shield 21.

The radiation shield 21 is thermally contracted in a radial direction around a certain thermal contraction specified point by a member for supporting the radiation shield 21. As illustrated in FIG. 11, the radiation shield 21, which is similar to the coil holding member 2, is press-supported or abutment-supported by restriction members 6xx and 6yy (not shown), and 6zz, and pressing springs 7xx, 7yy (not shown), and 7zz. Thus, the thermal contraction specified point of the radiation shield 21 is a point (R) of intersection of an X-side end surface and a Y-side end surface, which are provided at the side of the abutment member. The radiation shield 21 is thermally contracted in a radial direction around the position of the point (R).

In this case, it is necessary to prevent the interference between the shaft member 20, the position of which does not vary, and each of the radiation shield 21, the coil 1, and the coil holding member 2, which are cooled to low temperature. In the case where the radiation shield 21 contacts the shaft member 20, heat is transferred from the shaft member 20 to the radiation shield 21, so that the temperature of the radiation shield 21 rises. Consequently, desired heat shield effects may not be achieved.

Thus, the shaft member 20 and the approximately pipe-like member 21b of the radiation shield 21 are provided by shifting the center position of the shaft member 20 from the center position of the approximately pipe-like member 21b of the radiation shield 21 in the direction of thermal contraction. Consequently, an allowable thermal contraction amount, at which the radiation shield 21 does not interfere with the shaft member 20, can be increased.

Additionally, because the radiation shield 21, the coil 1, and the coil holding member 2 differ from one another in material and temperature, thermal contraction amounts of the radiation shield 21, the coil 1, and the coil holding member 2 may differ from one another. In this case, the radiation shield 21 and the coil 1 are placed by shifting the center position of the approximately pipe-like member 21b of the radiation shield 21 from the center position of the hollow portion of the coil 1. Consequently, the radiation shield 21 can be maintained in a state in which the radiation shield 21 does not contact the coil 1. It is sufficient to appropriately determine amounts of shifting the center positions of the radiation shield 21, the core 1, and the shaft member 20 so that the radiation shield 21, the core 1, and the shaft member 20 are maintained in a state in which the radiation shield 21, the coil 1, and the shaft member 20 do not contact one another even in the case where the entire apparatus is at normal temperature, or where the coil 1 and the coil holding member 2 are cooled.

Fourth Exemplary Embodiment

Figure 13:
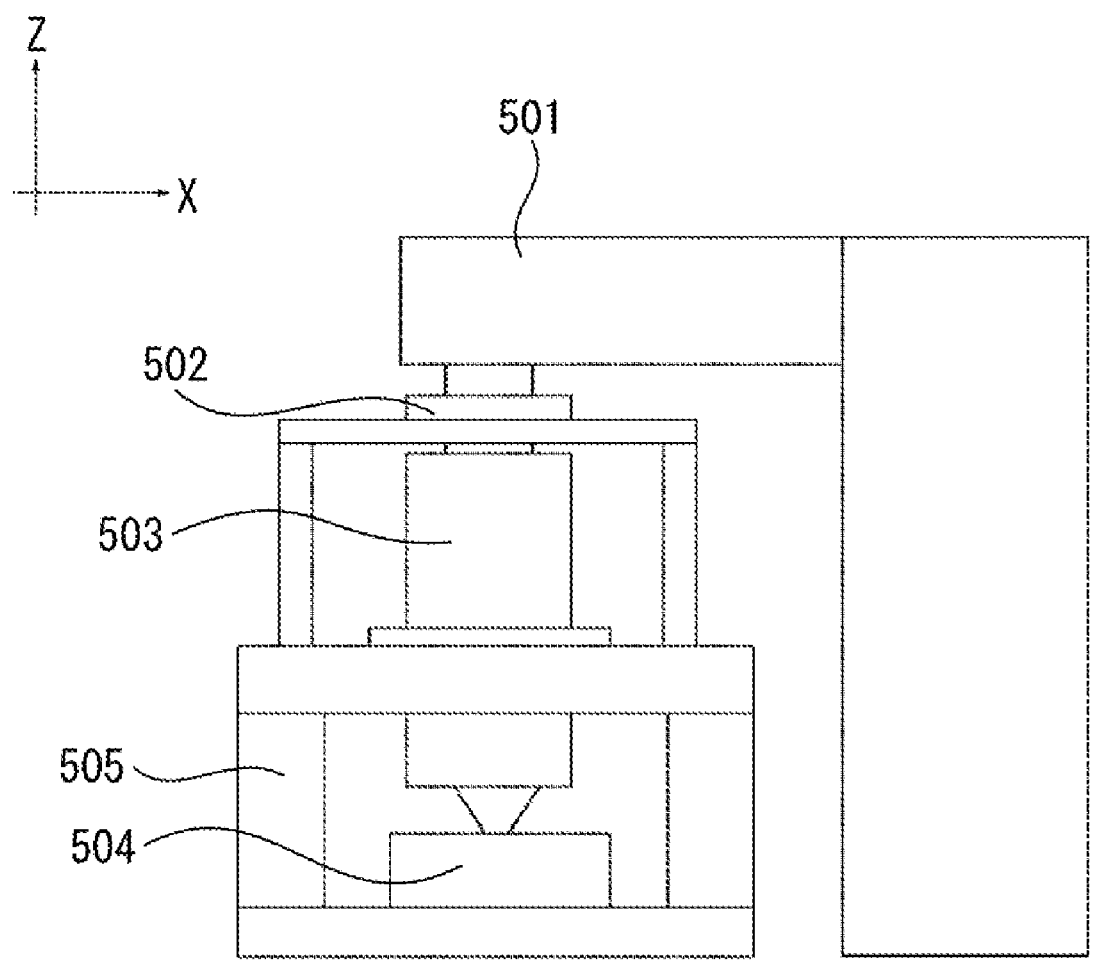
FIG. 13 illustrates an exposure apparatus according to an exemplary embodiment of the present invention.
Figure 14A:
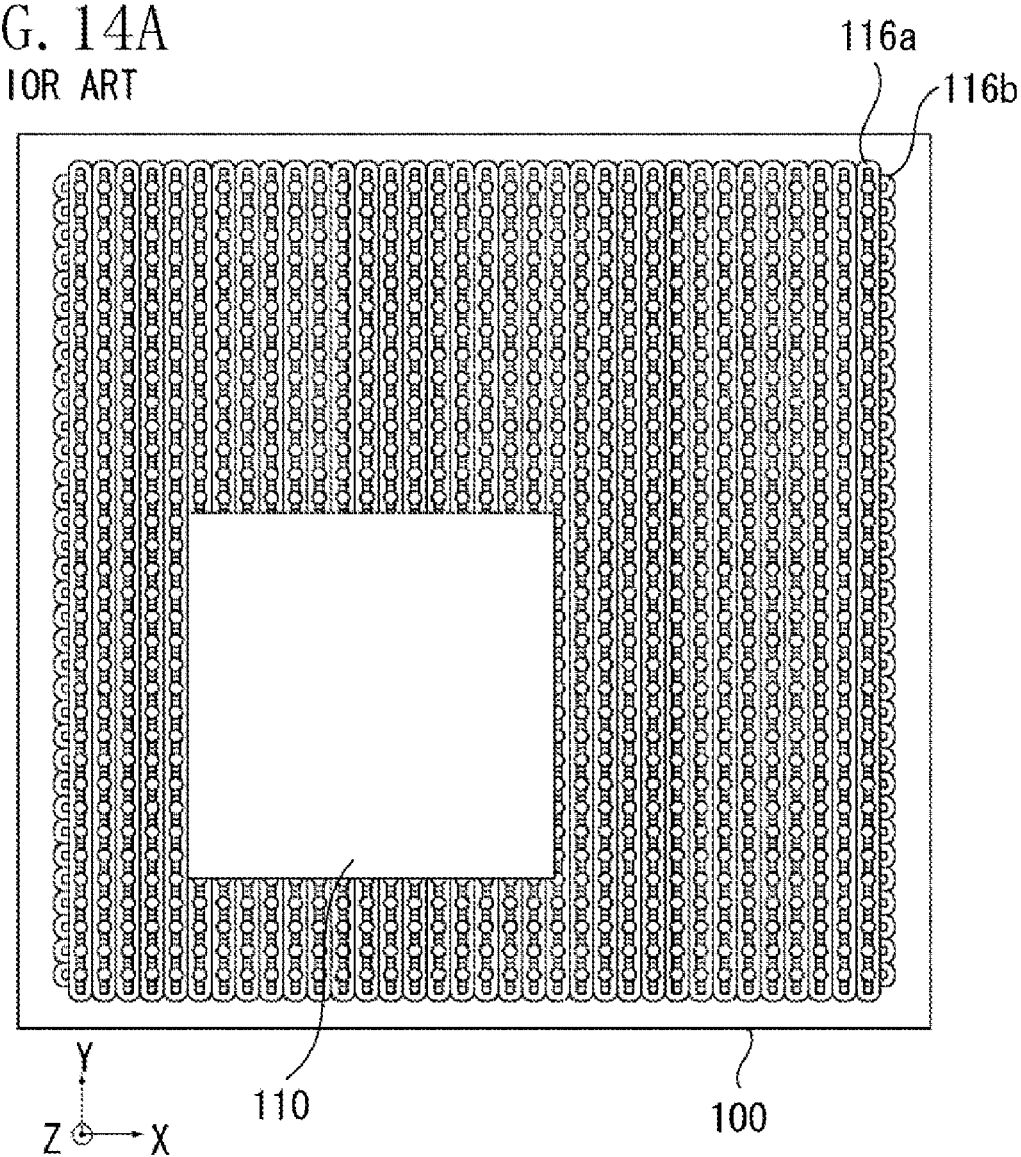
FIGS. 14A and 14B each illustrate a conventional planar motor type stage.
Figure 14B:
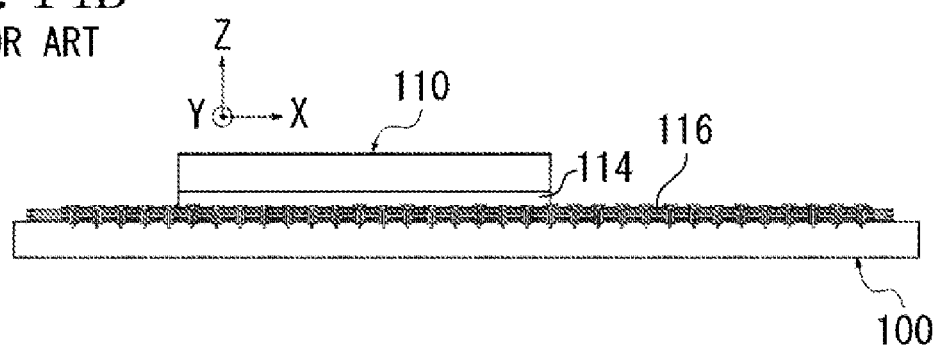
Figure 15:
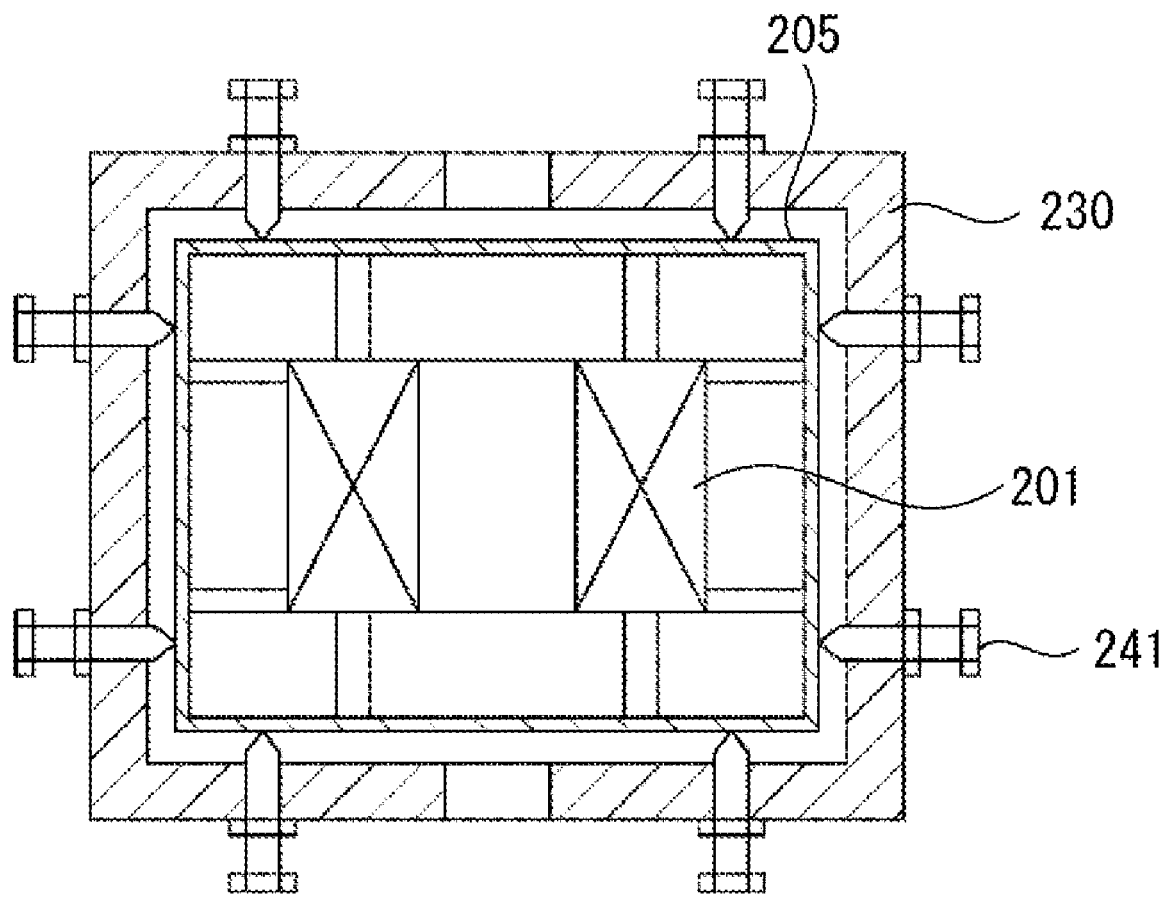
FIG. 15 illustrates a conventional coil supporting configuration.

An exemplary exposure apparatus, to which the driving apparatus according to an exemplary embodiment of the present invention can be applied, is described below. As illustrated in FIG. 13, an exposure apparatus body 505 includes an illumination apparatus 501, a reticle stage 502 on which a reticle is mounted, a projection optical system 503, and a wafer stage 504 on which a wafer is mounted. The exposure apparatus projects a circuit pattern formed on the reticle onto the wafer. The exposure apparatus can be of either the step-and-repeat projection-exposure type or the step-and-scan projection-exposure type.

The illumination apparatus 501 illuminates the reticle on which a circuit pattern is formed. The illumination apparatus 501 includes a light source unit and an illumination optical system. The light source unit uses, e.g., a laser as a light source. The laser is, e.g., an ArF excimer laser, whose wavelength is about 193 nm, a KrF excimer laser, whose wavelength is about 248 nm, or an $F_2$ excimer laser, whose wavelength is about 157 nm. The type of the laser is not limited to the excimer laser. For example, a Yttrium-Aluminum Garnet (YAG) laser can be used. In addition, the number of lasers is not limited to a specific number. In the case where a laser is used as the light source, preferably, the light source unit uses a laser-beam shaping optical system for shaping parallel laser beams coming from the laser source into a desired beam shape, and an incoherent-beam producing optical system for converting a coherent laser beam to an incoherent beam. Additionally, the light source, which can be used in the light source unit, is not limited to a laser. One or more lamps, such as mercury lamps or xenon lamps, can be used.

The illumination optical system illuminates a mask or reticle. The illumination optical system includes a lens, a mirror, a light integrator, and a diaphragm.

An optical system (catadioptric optical system) including a plurality of lens elements and at least one concave mirror can be used as the projection optical system 503. Alternatively, an optical system including a plurality of lens elements and at least one diffractive optical element, such as kinoform gratings, can be used as the projection optical system 503. Alternatively, an all-mirror type optical system can be used as the projection optical system 503.

The reticle stage 502 and the wafer stage 504 can be moved by, e.g., a linear motor. In the case of the exposure apparatus of the step-and-scan projection-exposure type, the stages 502 and 504 are moved in synchronization with each other. An additional actuator is provided on at least one of the wafer stage 504 and the reticle stage 502 so as to align the circuit pattern of the reticle onto the wafer.

Such an exposure apparatus can be used to manufacture a semiconductor device, such as a semiconductor integrated circuit, and a device on which a micropattern is formed, such as a micromachine or a thin-film magnetic head.

Fifth Exemplary Embodiment

Devices (e.g., semiconductor integrated circuit devices, and liquid crystal display devices) are manufactured through a exposing step of exposing a substrate coated with a photosensitive resist layer using the exposure apparatus according to the above-described exemplary embodiment, a developing step of developing the substrate exposed in the exposing step, and other known steps of processing the substrate developed in the developing step, dicing and assembly.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-228543 filed Sep. 4, 2007, which is hereby incorporated by reference herein in its entirety.

What is claimed is:

1. A driving apparatus comprising:
    a mover having a magnet; and
    a stator having a coil, wherein the driving apparatus is adapted to control the electric current to be applied to the coil to cause relative movement between the mover and the stator, and
    wherein the stator comprises:
        a coil holding member configured to hold the coil;
        a supporting member configured to support the coil holding member movably in first and second directions;
        a restriction member configured to restrict movement of the coil holding member in the first direction and to allow movement of the coil holding member in the second direction; and
        a biasing unit configured to press the coil holding member against the restriction member.

2. The driving apparatus according to claim 1, wherein the stator further comprises a cooling unit configured to cool the coil.

3. The driving apparatus according to claim 2, wherein the biasing unit is configured to press the coil holding member against the restriction member during a period when the coil is cooled by the cooling unit.

4. The driving apparatus according to claim 1, wherein the stator further comprises:
    a second restriction member configured to restrict movement of the coil holding member in the second direction and to allow movement of the coil holding member in the first direction; and
    a second biasing member configured to press the coil holding member against the second restriction member.

5. The driving apparatus according to claim 4, wherein the coil includes a plurality of coils, and
    wherein the plurality of coils are arranged in the first direction and the second direction.

6. The driving apparatus according to claim 1, wherein the biasing unit presses the coil holding member with a force stronger than a driving reaction force received by the coil when the mover is driven.

7. The driving apparatus according to claim 1, further comprising a chamber configured to contain the coil and the coil holding member,
    wherein the chamber is capable of maintaining a vacuum therein.

8. The driving apparatus according to claim 7, wherein the biasing unit includes a bellows,
    wherein the bellows connects the chamber to the coil holding member and is mounted at a side opposite to a surface of the coil holding member that contacts the restriction member, and
    wherein the bellows is pressed against the coil holding member by a differential pressure.

9. The driving apparatus according to claim 7, wherein the stator further comprises a cooling unit configured to cool the coil, the cooling unit being configured to cool the coil by connecting a refrigerator to the coil holding member,
    wherein the refrigerator is fixed to the container via the bellows, and
    wherein the biasing unit is mounted at a side opposite to a surface of the coil holding member that contacts the restriction member and is configured to use a differential pressure received by the refrigerator.

10. The driving apparatus according to claim 7, wherein the container includes a shaft member configured to prevent a deformation from being caused due to a reduced pressure inside the chamber,
    wherein the shaft member is mounted to extend through a hollow portion of the coil, and
    wherein the shaft member is shifted in a direction in which a center position of the shaft member is provided closer to a specified point of thermal contraction of the coil holding member with respect to a center position of the hollow portion of the coil as the distance from the specified point increases.

11. The driving apparatus according to claim 1, wherein the biasing unit includes one of a spring member, an electromagnetic actuator, and a magnet.

12. The driving apparatus according to claim 1, wherein the biasing unit includes a spring member, and
    wherein the spring member is mounted on a surface of the coil holding member that contacts the restriction member.

13. The driving apparatus according to claim 1, wherein the coil consists of or includes a superconductive material.

* * * * *